United States Patent [19]

Wright

[11] Patent Number: 4,696,610
[45] Date of Patent: Sep. 29, 1987

[54] BLIND FASTENER

[76] Inventor: Jewel L. Wright, 1506 W. Flora Ave., Santa Ana, Calif. 92704

[21] Appl. No.: 777,464

[22] Filed: Sep. 18, 1985

[51] Int. Cl.⁴ .................................................. F16B 13/06
[52] U.S. Cl. ....................................... 411/38; 411/43; 411/59
[58] Field of Search ............................ 411/34–38, 411/43, 57, 59, 60, 61, 70

[56] References Cited

U.S. PATENT DOCUMENTS

| 1,111,660 | 9/1914 | Malaby | 411/38 |
| 3,230,818 | 1/1966 | Siebol | 411/34 |
| 3,368,446 | 2/1968 | Glenn | 411/57 |
| 3,438,301 | 4/1969 | Mattioli | 411/34 |
| 3,789,728 | 2/1974 | Shackelford | 411/34 |
| 4,293,258 | 10/1981 | McKewan | 411/43 X |
| 4,475,856 | 10/1984 | Toomingas | 411/61 X |
| 4,566,750 | 1/1986 | Umezu | 411/43 X |

FOREIGN PATENT DOCUMENTS

| 960045 | 10/1955 | Fed. Rep. of Germany | 411/70 |
| 2947751 | 8/1981 | Fed. Rep. of Germany | 411/34 |
| 445204 | 2/1968 | Switzerland | 411/34 |
| 594859 | 11/1947 | United Kingdom | 411/43 |
| 711095 | 6/1954 | United Kingdom | 411/61 |

Primary Examiner—Robert L. Wolfe
Assistant Examiner—Lloyd A. Gall
Attorney, Agent, or Firm—Knobbe, Martens, Olson & Bear

[57] ABSTRACT

A blind fastener of the type wherein a cylindrical stem or mandrel pulled within a tubular sleeve or rivet body to cause legs formed in the latter to collapse outwardly into engagement with the blind side of a work piece. Such legs are formed in the rivet body by providing longitudinal cuts or slots, and each of such legs is deformed or crimped inwardly to provide an offset condition which virtually insures proper and effective outwardly collapsing of all of the legs, substantially simultaneously. The stem is further provided with a portion for engaging such legs at their respective offset locations to insure hole-filling and strong, firm setting of the collapsed legs against the work piece.

6 Claims, 9 Drawing Figures

U.S. Patent  Sep. 29, 1987  4,696,610
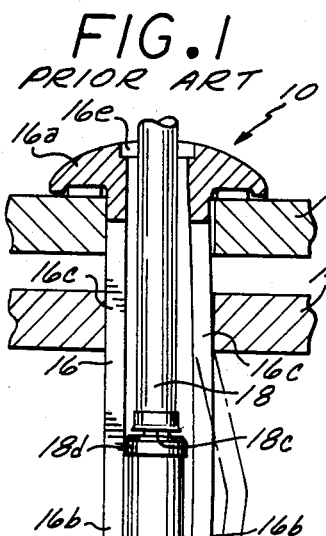
FIG.1 PRIOR ART
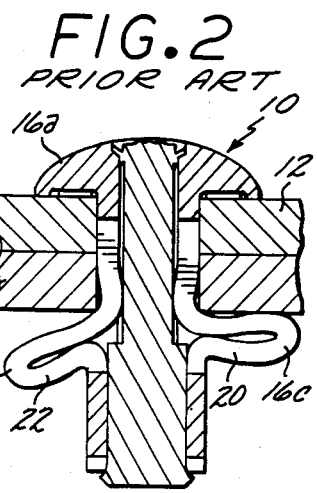
FIG.2 PRIOR ART
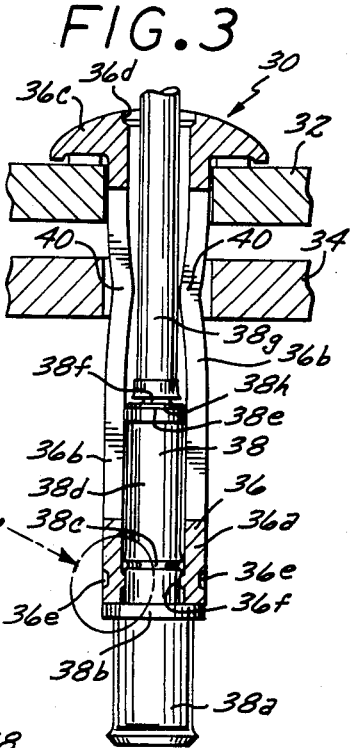
FIG.3
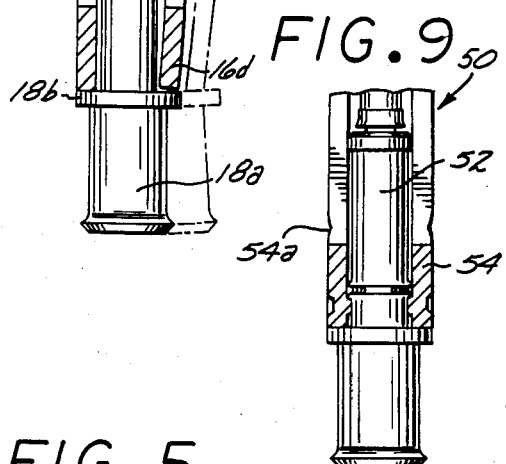
FIG.9      FIG.4
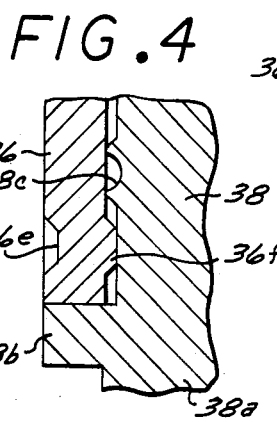
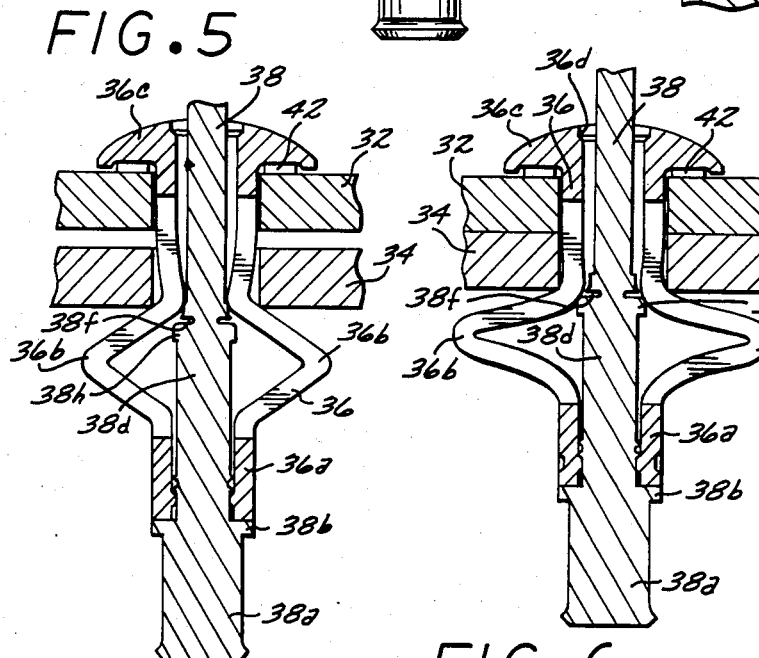
FIG.5     FIG.6     FIG.7
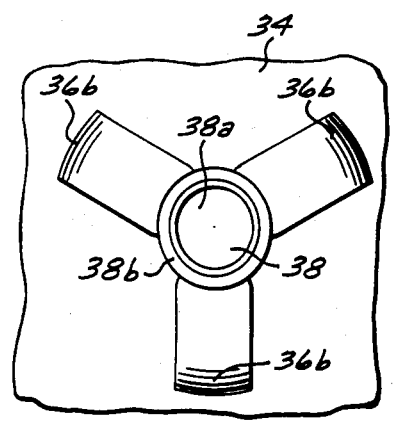
FIG.8

BLIND FASTENER

The present invention relates generally to fasteners, but more specifically to blind fasteners having legs formed in a rivet body, which legs collapse outwardly into engagement with the blind side of a work piece, and wherein such blind side engagement is distributed evenly over a relatively large area of such work piece.

BACKGROUND OF THE INVENTION

For many decades now, many different forms or styles of blind fasteners have been provided for engagement with many different types of work pieces. Such fasteners are used in extremely large quantities on trucks and trailers and on metal buildings and the like, and permit the installer to effect a strong, effective engagement between such fastener and a work piece, with installation being from only a single side.

Typically, such blind fasteners employ a hollow tubular member wherein a mandrel is slideably positioned, the blind end portions of each of such members being connected together so that pulling on the mandrel causes collapse of the hollow tubular member.

Prior devices have shown some inconsistencies with respect to effective installation, due to the dimensional and metallurgical inconsistencies of each tubular rivet body. That is, it is not uncommon in such blind fasteners for the rivet body to be stronger on one side than the other due to differences in mettalurgical content or wall thickness, or the like. As a result, such prior structures have been subject to tilting and turning as the mandrel or stem is pulled by the automatic installation tool for the purpose of collapsing the tubular member against the work piece. As such, it has long been a desired objective to provide a blind fastener wherein the tubular rivet is caused to collapse uniformly on all sides so as to engage the work piece uniformly thereabout, and to apply a uniform pressure on the blind side of the work piece even when the holes in the work pieces are considerably larger than the body of the fastener and are misaligned.

OBJECTS OF THE INVENTION

In view of the foregoing, it is an object of the present invention to provide a blind fastener which is capable of collapsing substantially uniformly and evenly against the blind side of the work piece, even in oversized and misaligned holes.

Another object of the present invention is to provide a blind fastener as characterized above wherein the usual column position of the sidewall of the rivet body is interrupted so that the collapse thereof is more uniformly controlled.

A still further object of the present invention is to provide a blind fastener as characterized above wherein the shape of the wall of the rivet body as it collapses against the work piece is such as to minimize undesirable forces on the work piece.

An even still further object of the present invention is to provide a blind fastener as characterized above wherein the rivet body is formed with cuts or slots providing collapsible legs, and wherein such legs are initially crimped at one or several locations so as to provide one or several offsets for controlling the collapse thereof during installation.

Another even still further object of the present invention is to provide a blind fastener as characterized above wherein such crimping is strategically located with respect to the operating range of the fastener so as to insure that the collapsing function results in a blind head of uniform shape and physical characteristics within such operating range.

Another object of the present invention is to provide a blind fastener as characterized above which is simple and inexpensive to manufacture, and which is rugged and dependable in operation.

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 1 is a sectional view of a prior art fastener, showing, in broken lines, the initial stage of a potentially faulty installation;

FIG. 2 is a sectional view showing faulty installation of a prior art fastener;

FIG. 3 is a sectional view of a fastener according to the present invention;

FIG. 4 is a fragmentry sectional view of the area designated with numeral 4 in FIG. 3;

FIG. 5 is a sectional view showing partial installation of the fastener of FIG. 3;

FIG. 6 is a sectional view showing a further installation step in installing the fastener of FIG. 3;

FIG. 7 is a sectional view showing the fastener of FIG. 3 firmly installed in work pieces;

FIG. 8 is an elevational view showing the blind side of the installed fastener; and FIG. 9 is a fragmentary sectional view of a second embodiment of the present invention.

Like reference characters indicate corresponding parts throughout the several views of the drawings.

DESCRIPTION OF THE PREFERRED EMBODIMENT

Referring to FIG. 1 of the drawings, there is shown therein a prior art fastener 10 to be mounted within work pieces 12 and 14. Such fastener 10 comprises a tubular rivet body 16 which is formed at one end with a rivet head 16a, and a stem or mandrel 18 which is positioned within such rivet body. The tubular rivet body 16 is formed with a plurality of longitudinal cuts or slots 16b which thereby form a corresponding number of collapsible legs 16c.

The stem 18 is generally cylindrical in nature, and is formed with a blind end portion 18a adjacent to which there is provided a shear ring 18b, which engages the blind end 16d of rivet body 16. A break notch 18c is formed in the intermediate portion of mandrel 18, adjacent to which there is provided an annular locking portion 18d to be engaged by an annular swaging element on the installation tool to expand such locking portion into engagement with an annular cutout or recess 16e at the head 16a of rivet body 16.

Such prior art fastener 10 is installed by utilization of an installation tool (not shown) whereby the stem or mandrel 18 is pulled while the head 16a of rivet body 16 is pushed toward work piece 12 from the active side represented by the head 16a of fastener 10. Under such force, tension is created in stem or mandrel 18, and corresponding compression is generated in the legs 16c of rivet body 16. As such, the entire rivet body acts as a column until sufficiently non-uniform or irregular forces prevail within legs 16c to cause them to collapse. When that occurs, it might be that some, but not all, of such legs collapse at that moment, or the various legs might collapse in different directions. In any event, it is not uncommon for the entire fastener 10 to be canted or twisted off line, as represented by the broken lines in FIG. 1 of the drawings.

Such irregularities during installation almost certainly insure that the fastener 10 will be installed ineffectively, as shown in FIG. 2 of the drawings. Therein, it is seen that, whereas one leg 16c, namely the one identified with the numeral 20, has collapsed properly against the blind side of work piece 14, the leg 16c identified with the numeral 22 has failed to firmly engage such work piece. Thus, the prior art fastener 10 is installed very poorly in a weak and ineffective manner.

Referring to FIG. 3 of the drawings, the subject invention is a fastener 30 to fasten two work pieces 32 and 34. The fastener comprises a tubular rivet body 36 having a solid annular blind end portion 36a, and a plurality of legs 36b formed as a result of cuts or slots in the wall of such rivet body. A head 36c is formed on the end of rivet body 36, and an annular locking depression or recess 36d is formed therein, as shown.

Blind end 36a of rivet body 36 is formed with two or more detents 36e which provide inwardly extending protuberances 36f which, as will hereinafter become more readily apparent, assist the fastener in remaining in its assembled condition.

A longitudinally moveable stem or mandrel 38 is provided within the tubular rivet body 36, the blind end 38a of such mandrel engaging the blind end 36a of rivet body 36 through an annular shear portion or element 38b. Stem 38 is further formed with an annular groove 38c, which cooperates with the protuberances 36f formed in rivet body 36 to insure that the rivet body and stem remain in assembled condition before installation. Mandrel 38 is provided with an enlarged intermediate portion 38d, adjacent to which there is provided a locking portion 38e and a break notch 38f. The locking portion 38e is operable to be offset into recess 36d of rivet body 36, as will hereinafter become more readily apparent.

Intermediate portion 38d of mandrel 38 is of larger diameter than portion 38g causing the locking portion 38e to provide a shoulder 38h which extends radially outwardly beyond the portion 38g. Such shoulder 38h is formed with appropriate longitudinal cuts to enable material from such annular shoulder to lock the fastener in place, as will hereinafter be explained in greater detail.

As shown at 40 in FIG. 3 of the drawings, each of the legs 36b of rivet body 36 is formed with an inwardly set crimp, thus placing the crimp portion 40 closer to the longitudinal center line of the blind fastener 30. As will hereinafter appear in greater detail, such crimp 40 in each of the legs 36b disrupts the column action or condition of the respective leg to effectively control the installation of the fastener.

The fastener 30 shown in FIG. 3 of the drawings has particular utility in sheet takeup (drawing together the work pieces 32 and 34 during installation), and in providing uniform and strong installation of fastener 30 within the work pieces.

As shown in FIG. 5 of the drawings, initial pulling on the mandrel 38, and pushing on the head of rivet body 36, causes each of the legs 36b to be moved slightly inwardly toward the mandrel due to moderate compressive forces applied to the rivet body. This, it will be noted, is to be distinguished from the considerably larger compressive forces required to cause collapse of the legs 16c of the prior art fastener 10, due to the column action offered by the latter.

After legs 36b of fastener 30 have collapsed inwardly slightly, they are then caused to collapse outwardly and, as depicted in FIG. 5 of the drawings, such action immediately tends to draw together the work pieces 32 and 34, as sheet takeup. To insure proper collapsing of legs 36b with respect to the work pieces, it is necessary that the aforedescribed crimping 40 be within the range of thickness of the work pieces for which the fastener 30 is designed. That is, such crimping 40 should be provided within the fastener range, and close to the maximum thereof.

With continued installation of the fastener 30, the legs 36b continue to collapse or fold radially outwardly, as shown in FIG. 6 of the drawings. At that point, the annular shoulder 38h on mandrel 38 engages the legs 36b at or near the crimping 40 to provide a laterally outward force thereon to assist the rivet body in filling the aligned holes of the work pieces 32 and 34. By these means hole fill is accomplished after the work pieces are pulled together. In prior art fasteners hole fill is accomplished before work pieces are pulled together which tends to lock work pieces apart, thus reducing the pull-together capability.

Ultimately, the shoulder 38h of the larger intermediate body portion 38d cams such legs into their hole-filling position, as shown in FIG. 7 of the drawings, and the legs 36b are individually, but simultaneously, deformed against the blind side of work piece 34 with substantially equal force and pressure. At all times during the installation until the legs 36b are fully formed against the blind side of the work piece, the annular shoulder 38b bears evenly against the blind side end of the rivet body 36, and at no time pulls within the blind side end of the rivet body in the manner employed in prior art. Thereafter, the forces between the blind end of the rivet body and shoulder 38b increase to a predetermined load where the annular shoulder 38b is sheared from the mandrel 38.

This annular shoulder 38b is designed to shear in both maximum and minimum recommended work piece thicknesses, thereby insuring that within this work piece thickness range, the legs 36b will be urged into contact with the blind side work piece with a predetermined force which is not too high so as to distort the work pieces, nor too small so as to result in an inadequate residual tensile loading on the work pieces. After it shears, the annular shoulder 38b is caused to slide down the mandrel. In maximum grip the sheared annular shoulder usually engages the enlarged end of end portion 38a, as shown in FIG. 7. However, in any event, the sheared ring is always retained on the mandrel 38, regardless of the size of the work pieces within the prescribed grip range.

Throughout such shearing of shoulder 38b and moving of the resulting ring down the mandrel, the end face of the blind end of the rivet body is in contact with such ring. However, the force required to move the ring down the mandrel is much less than the load required to finally set the rivet legs 36b, and then shear the shoulder.

38b from the mandrel 38. By this means the full strength of the break notch 38f is made available to form a strong lock when the installtion tool forces the metal of the locking portion of the stem 38d into the locking groove or recess 36d on the rivet. The setting or installation tool deforms the annular locking shoulder 38h by separating the material along the aforedescribed cuts in such shoulder, and folds such locking material outwardly into a locked position within annular recess 36d. Thereafter, the mandrel 38 is broken at the break notch 38f due to increased resistance to further movement of the mandrel to cause the fastener 30 to be firmly installed, as shown in FIGS. 7 and 8.

As shown in the drawings, a resilient washer 42 may be provided between the head 36c of rivet body 36 and the work piece 32 to provide a water-tight seal therebetween as a result of the aforedescribed installation of fastener 30.

A second embodiment 50 of the present invention is shown in FIG. 9 wherein a mandrel 52 is provided which is substantially identical with the mandrel 38 hereinabove described with respect to the first embodiment. The sleeve 54 of such second embodiment 50 is similar to the sleeve 36 of the first embodiment, but, in such second embodiment, is provided with two separate and individual crimps. Firstly, the sleeve 54 is provided with a first crimp near the work pieces, as hereinabove described with respect to the first embodiment, but, in addition thereto, is provided with a second crimp, as shown at 54a. This second or additional crimp further controls the collapsing of the legs of the sleeve portion of the rivet body so as to further insure that there is no unevenness in forming the head of the rivet on the blind side of the work pieces.

Although for most applications the first embodiment above described, namely wherein only a single crimp is utilized, will prove satisfactory in providing the desired uniform blind head, for certain applications or, more particularly for certain grip ranges, the multiple crimpling has ben found more satisfactory in providing predictable desired blind heads.

It is noted that the present invention provides a blind fastener which is an improvement over the prior art in that it is considerably less susceptible to twisting and turning during installation such that it is considerably more reliable during installation, as well as thereafter, in providing a strong, firm, consistent and uniform fastening function.

Although I have shown and described certain specific embodiments of my invention, I am well aware that many modifications thereof are possible. The invention, therefore, is not to be restricted except insofar as is necessitated by the prior art, and by the spirit of the appended claims.

I claim:

1. A blind fastener having a stem movably positioned within a sleeve and attached thereto for pulling a solid annular blind end of said sleeve and urging legs of said sleeve into engagement with a work piece, the combination therewith of,
    legs formed in said sleeve extending longitudinally thereof and separated by slots, said legs terminating at a location axially spaced from said blind end; and
    at least one crimped portion formed in each of said legs to control the collapse of said legs as said stem pulls said legs into engagement with said work piece, said crimped portions being closer to the stem than the remainder of the respective leg, and said crimped portions being at substantially the same axial location in each leg so that the legs collapse uniformly, said crimped portions being axially located within the grip range of the particular blind fastener.

2. A blind fastener having a stem moveably positioned within a sleeve and attached thereto for pulling the blind end of said sleeve into engagement with a work piece, the combination according to claim (3) 1 wherein said sleeve is formed with longitudianl slots forming a plurality of substantially identical legs spaced equiangularly thereabout, and said blind end of said sleeve is attached to said stem, thereby defining the diameter thereat,
    said (offset) crimped portions in said legs providing a diameter for said sleeve which is less than the diameter of said bond end.

3. A blind fastener having a stem moveably positioned within a sleeve and attached thereto for pulling the blind end of said sleeve into engagement with a work piece, the combination according to claim 1 wherein said (offsets) crimped portions are so located along said legs as to be near the maximum work piece thickness for the particular grip range.

4. A blind fastener having a stem moveably positioned within a sleeve and attached thereto for pulling the blind end of said sleeve into engagement with a work piece, the combination according to claim 3 wherein said stem is formed with an annular shoulder engageable with the (offsets) crimped portions in said legs as said step is moved relative to said sleeve to assist said legs in engaging said work piece.

5. A blind fastener having a stem moveably positioned within a sleeve and attached thereto for pulling the blind end of said sleeve into engagement with a work piece, the combination according to claim 4 wherein said shoulder of said stem urges said (offsets) crimped portions of said legs radially outwardly but only after said legs have collapsed radially outwardly sufficiently to have engaged said work piece.

6. A blind fastener having a stem moveably positioned within a sleeve and attached thereto for pulling the blind end of said sleeve into engagement with a work piece, the combination according to claim 5 wherein said engagement of said work piece by said legs occurs a predetermined radial distance from said stem.

* * * * *